(12) United States Patent
Mori

(10) Patent No.: US 12,067,310 B2
(45) Date of Patent: Aug. 20, 2024

(54) PROCESSING METHOD FOR TRANSFERRING JOB TO EXECUTE IMAGE PROCESS BY CHANGING SUBJECT OF AGREEMENT FROM FIRST IMAGE PROCESSING DEVICE TO SECOND IMAGE PROCESSING DEVICE

(71) Applicant: BROTHER KOGYO KABUSHIKI KAISHA, Nagoya (JP)

(72) Inventor: Tetsunori Mori, Kariya (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 0 days.

(21) Appl. No.: 18/325,235

(22) Filed: May 30, 2023

(65) Prior Publication Data
US 2023/0384994 A1    Nov. 30, 2023

(30) Foreign Application Priority Data

May 30, 2022  (JP) ................................. 2022-087855
May 12, 2023  (JP) ................................. 2023-079213

(51) Int. Cl.
*G06F 3/12*         (2006.01)
(52) U.S. Cl.
CPC .......... *G06F 3/1222* (2013.01); *G06F 3/1238* (2013.01)
(58) Field of Classification Search
CPC ......... G03G 21/02; G03G 2215/00109; G03G 2215/00113; G06F 3/1205; G06F 3/1239;
(Continued)

(56) References Cited

U.S. PATENT DOCUMENTS 9,218,554 B2 * 12/2015 Nishikawa .......... G06K 15/1822
2005/0275885 A1 * 12/2005 Sugiyama ............. G06F 3/1207
358/1.15
(Continued)

FOREIGN PATENT DOCUMENTS

JP    2010-117843 A    5/2010
JP    2011-97337 A     5/2011
(Continued)

OTHER PUBLICATIONS

Extended European Search Report issued in corresponding European Patent Application No. 23175817.8, Oct. 27, 2023.

*Primary Examiner* — Negussie Worku
(74) *Attorney, Agent, or Firm* — Merchant & Gould P.C.

(57) ABSTRACT

A processing method is for transferring a job to execute an image process by changing a subject of an agreement from a first image processing device to a second image processing device. In the method, a first controller of the first device acquires identification information for the second device from an external device. The first controller stores, in the external memory connected to a first connector of the first device, the acquired identification information and job information specifying a job to perform an image process. Subsequently to connection of the external memory to a second connector of the second device, a second controller of the second device determines whether the identification information in the external memory matches identification information for the second device. When the identification information matches, the second controller executes the image process with the subject of agreement changed to the second device.

13 Claims, 7 Drawing Sheets

(58) Field of Classification Search
CPC ........ G06F 3/1291; G06F 16/29; G06F 18/25; G06F 3/1203; G06F 3/1222; G06F 3/1237; G06F 3/1287; G06F 3/1238; G06Q 10/02; G06Q 30/0211; G06Q 30/0631; G06Q 50/10; G06T 15/205; G06T 19/003
USPC .............................................. 358/1.15, 1.14
See application file for complete search history.

(56) References Cited

U.S. PATENT DOCUMENTS

| | | | | |
|---|---|---|---|---|
| 2007/0146778 | A1* | 6/2007 | Kitagata | G06F 3/1204 358/1.15 |
| 2008/0098396 | A1* | 4/2008 | Ebuchi | G06F 3/1207 718/102 |
| 2009/0002733 | A1 | 1/2009 | Kakigi | |
| 2009/0213411 | A1 | 8/2009 | Fukumi | |
| 2011/0001995 | A1* | 1/2011 | Sato | G06F 21/608 358/1.14 |
| 2017/0093865 | A1* | 3/2017 | Watanabe | G06F 3/1288 |
| 2020/0314265 | A1* | 10/2020 | Thangaraj | G06F 3/1261 |
| 2021/0034771 | A1* | 2/2021 | Watanabe | G06F 3/1238 |
| 2021/0289103 | A1* | 9/2021 | Mizuno | H04N 1/4426 |
| 2021/0314997 | A1* | 10/2021 | Seo | H04L 5/0094 |
| 2022/0171318 | A1* | 6/2022 | Kaigawa | G06Q 10/087 |
| 2022/0171583 | A1* | 6/2022 | Suzuki | G06F 3/1235 |
| 2022/0400014 | A1* | 12/2022 | Mori | G06F 3/1238 |
| 2023/0315360 | A1* | 10/2023 | Ban | G06F 3/1204 358/1.14 |
| 2023/0385004 | A1* | 11/2023 | Yamada | H04N 1/00925 |

FOREIGN PATENT DOCUMENTS

| | | |
|---|---|---|
| JP | 2020-135136 A | 8/2020 |
| JP | 2002-92299 A | 3/2022 |

* cited by examiner

PROCESSING METHOD FOR TRANSFERRING JOB TO EXECUTE IMAGE PROCESS BY CHANGING SUBJECT OF AGREEMENT FROM FIRST IMAGE PROCESSING DEVICE TO SECOND IMAGE PROCESSING DEVICE

REFERENCE TO RELATED APPLICATIONS

This application claims priorities from Japanese Patent Application Nos. 2022-087855 filed on May 30, 2022, and 2023-079213 filed May 12, 2023. The entire contents of the priority applications are incorporated herein by reference.

BACKGROUND ART

Some businesses offer services to users of image processing devices to provide a user with special subscription-based consumables or replacement parts for an image processing device after the user has entered an agreement with the business.

For example, with the conventional technology, users purchase computer peripherals such as printers under contract, and a management device stores attribute information and status information for the computer peripherals together with the corresponding user information.

When the user requests the replacement of a peripheral device, the management device issues instructions to the manufacturer's shipping department to ship a replacement peripheral device, whereby the shipping department ships the replacement peripheral device and collects the used peripheral device.

DESCRIPTION

However, when the peripheral device being replaced is a printer or other image processing device under contract, jobs that were received from external terminals but that could not be executed prior to replacement may still be stored on the image processing device. The conventional technology does not adequately address how such unsettled jobs are handled.

In view of the foregoing, it is an object of the present disclosure to provide a method of ensuring the security of jobs received by an image processing device just prior to being replaced and ensuring that such jobs can be executed on the new replacement image processing device.

In order to attain the above and other object, the present disclosure provides a processing method for transferring a job to execute an image process by changing a subject of an agreement from a first image processing device to a second image processing device. The first image processing device includes: a first memory; a first connector to which an external memory is connectable; a first controller; and a first communication interface. The second image processing device includes: a second connector to which the external memory is connectable; and a second controller. The processing method includes: the first controller acquiring a piece of identification information for the second image processing device from an external device via the first communication interface; the first controller storing, in the external memory connected to the first connector, the acquired piece of identification information and job information which is stored in the first memory, the job information specifying a job to perform an image process; subsequently to connection of the external memory to the second connector, the second controller determining whether the piece of identification information stored in the external memory matches a piece of identification information for the second image processing device; and when the piece of identification information stored in the external memory has been determined to match the piece of identification information for the second image processing device, the second controller executing the image process according to the job information stored in the external memory with the subject of agreement changed to the second image processing device.

According to another aspect, the disclosure provides an image processing device. The image processing device includes a connector, a communication interface, and a controller. An external memory is connectable to the connector. The controller is configured to perform: acquiring a function deactivating instruction and a piece of identification information for another image processing device, the deactivating instruction being to instruct to deactivate a prescribed function of the first image processing device; subsequently to the acquiring, receiving a job to execute an image process; and subsequently to receiving the job, storing the piece of identification information and job information in the external memory connected to the connector, the job information specifying the job.

According to still another aspect, the disclosure provides an image processing device. The image processing device includes a memory, a connector, and a controller. An external memory is connectable to the connector. The controller is configured to perform: when the external memory, which stores both job information and a piece of identification information, has been connected to the connector, determining whether the piece of identification information stored in the external memory matches a piece of identification information stored in the memory, the job information specifying a job to execute an image process; and when the piece of identification information stored in the external memory has been determined to match the piece of identification information stored in the memory, executing the image process according to the job information stored in the external memory.

In the above structure, the job received by the first image processing device prior to replacement can be executed on the second image processing device replacing the first image processing device while maintaining security.

FIRST EMBODIMENT

Below, an embodiment of the present disclosure will be described while referring to FIGS. 1-7. In this embodiment, a laser printer will be described as an example of the image processing device, and the image process will be a printing process. However, the image processing device may be a printer other than a laser printer. For example, the image processing device may be an inkjet printer.

Overview of an Image Processing System

Figure 1:
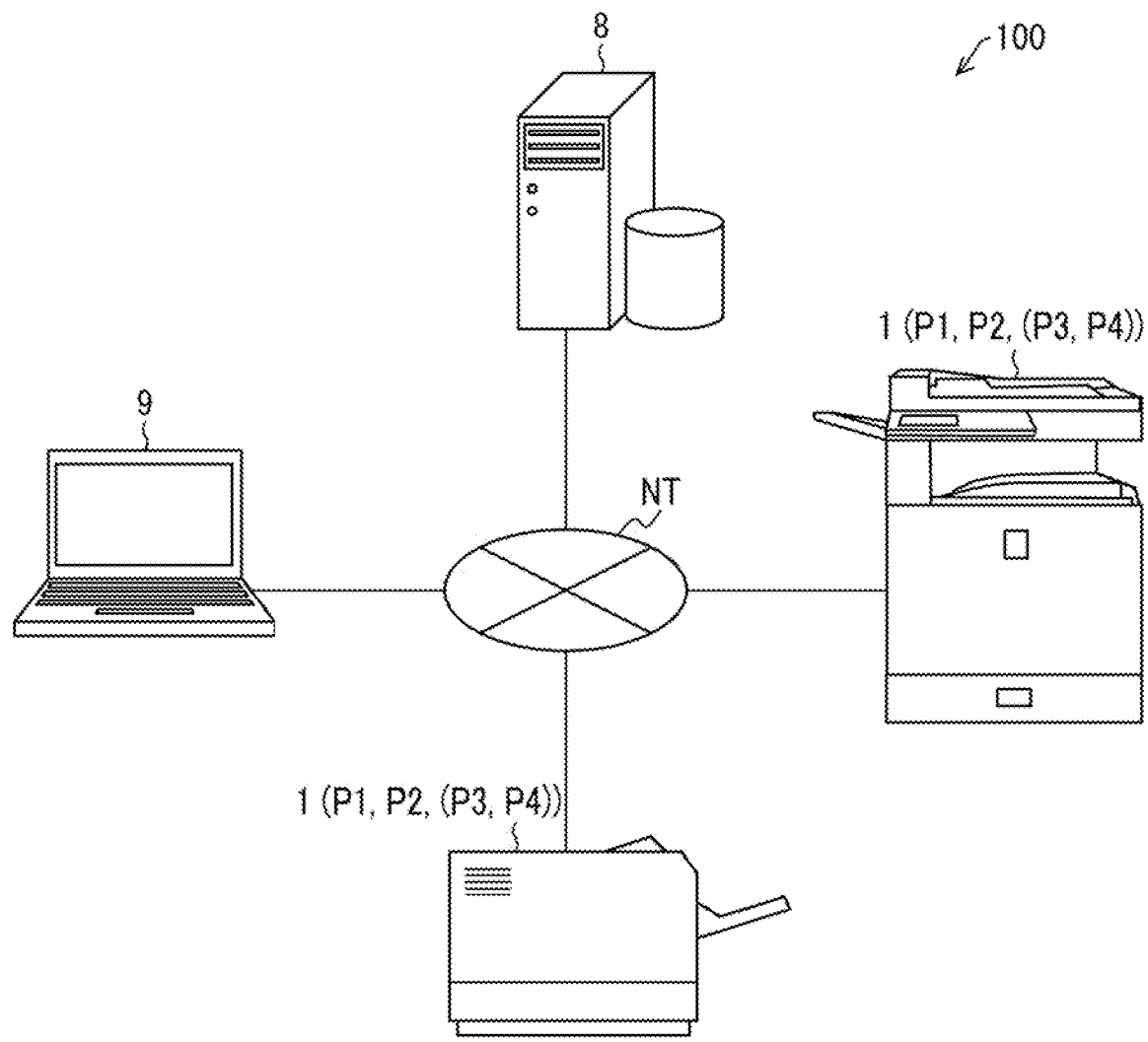
FIG. 1 is a schematic diagram illustrating an image processing system.

FIG. 1 shows an overview of an image processing system 100 according to the present embodiment. As shown in FIG. 1, the image processing system 100 includes a plurality of image processing devices 1, a server 8, and a user terminal 9. The image processing devices 1 shown in FIG. 1 have been contracted by the same user. However, the image processing system 100 may include other image processing devices (not shown) that are under contract (or agreement) with other users.

The image processing device 1 is a device for implementing a service when an agreement has been concluded for the image processing device 1. The server 8 is an external device that communicates with the image processing devices 1 via a network NT and serves as a management device for managing the image processing devices 1. In this embodiment, the server 8 is a server managed by a service provider.

The term "agreement" in the present embodiment denotes an agreement concluded between a user and a service provider by which the service provider provides a specific service to the user through one or more user-specified image processing devices 1. In other words, the user enters an agreement for one or more certain image processing devices 1. Put another way, the agreement has been concluded for one or more image processing devices 1. The image processing device 1 may also be considered the subject of the agreement. Hereinafter, each of one or more image processing devices 1 specified by the user as the subject of an agreement will be called the "subscribed device or machine."

With an agreement concluded (or established) between the user and the service provider, each image processing device 1 can use special subscription-based consumables. As an example of an agreement, the service provider providing the subscription service and the user agree on the usage period, usage fee, maximum number of sheets, and other terms of the service, and both parties agree that the service provider will provide this service to the user. In other words, once an agreement for the service has been concluded, the image processing device 1 according to the present embodiment can execute subscription printing, which is printing under the terms of the concluded agreement.

The user can register or change the image processing device 1 serving as the subscribed device (or the subject device) at any time. Here, the term "register" may indicate the action of registering a new image processing device or of re-registering a previously registered image processing device 1 which is not currently registered as the subject of the agreement or whose agreement has been canceled. The user can also register a plurality of image processing devices 1 as subjects of the agreement (subscribed devices). In other words, the user can use a plurality of image processing devices 1 simultaneously as subjects of the agreement (subscribed devices) and can change any of the image processing devices 1 being used as subjects of the agreement (subscribed devices) to another image processing device 1.

The user terminal 9 used by a user is a device that communicates with the server 8 in order to conclude or cancel agreements and perform other procedures. The user terminal 9 used by the user can perform operation to change the subject of the agreement from the image processing device 1 to another image processing device. An information processing terminal equipped with standard communication functions, such as a personal computer (PC) or a smartphone, may be employed as the user terminal 9. The devices configuring the image processing system 100 can communicate with each other over a communication network NT such as the Internet.

Overall Structure of an Image Processing Device 1

Figure 2:
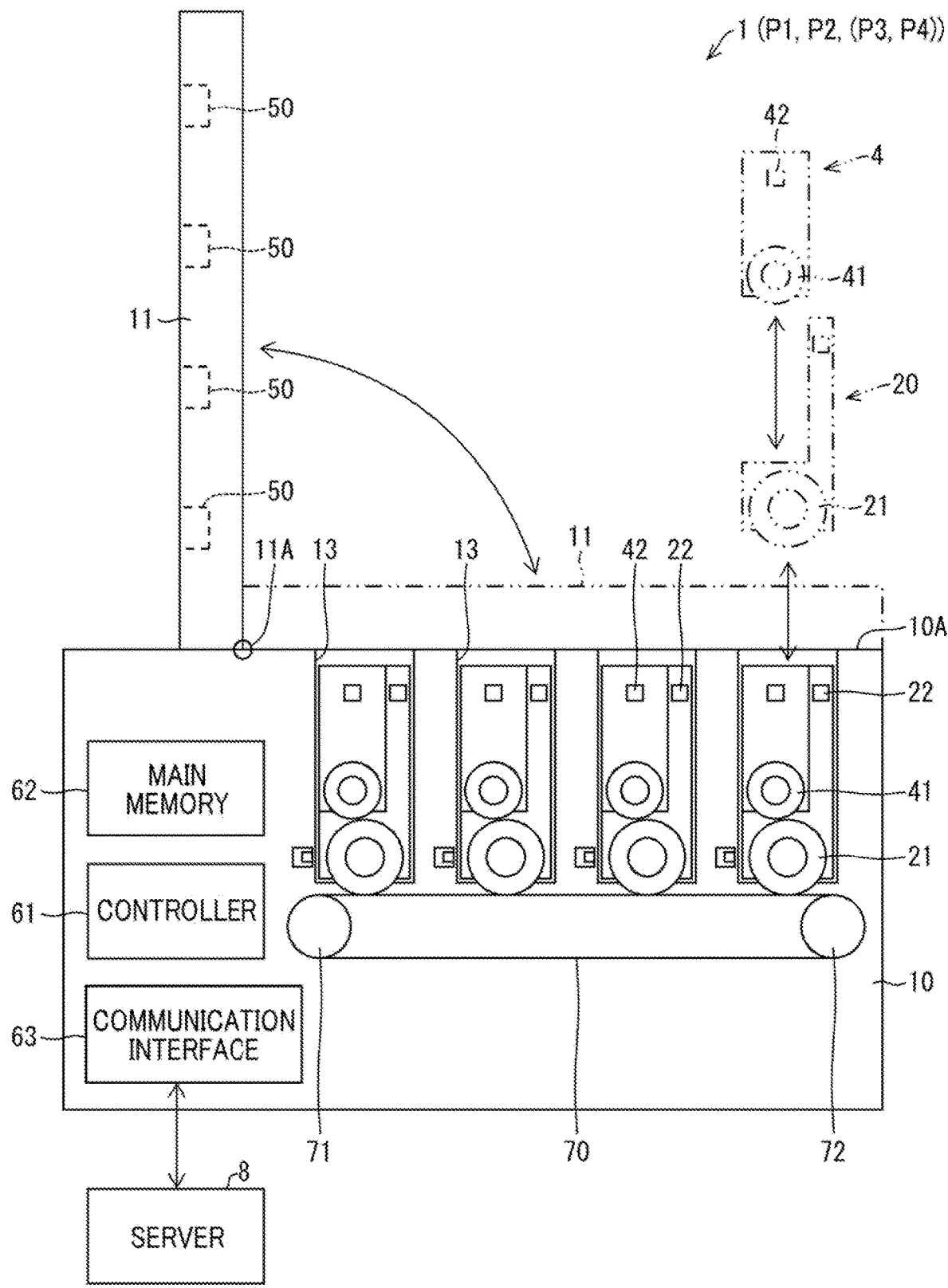
FIG. 2 is a schematic diagram illustrating an example of image processing devices.
Figure 3:
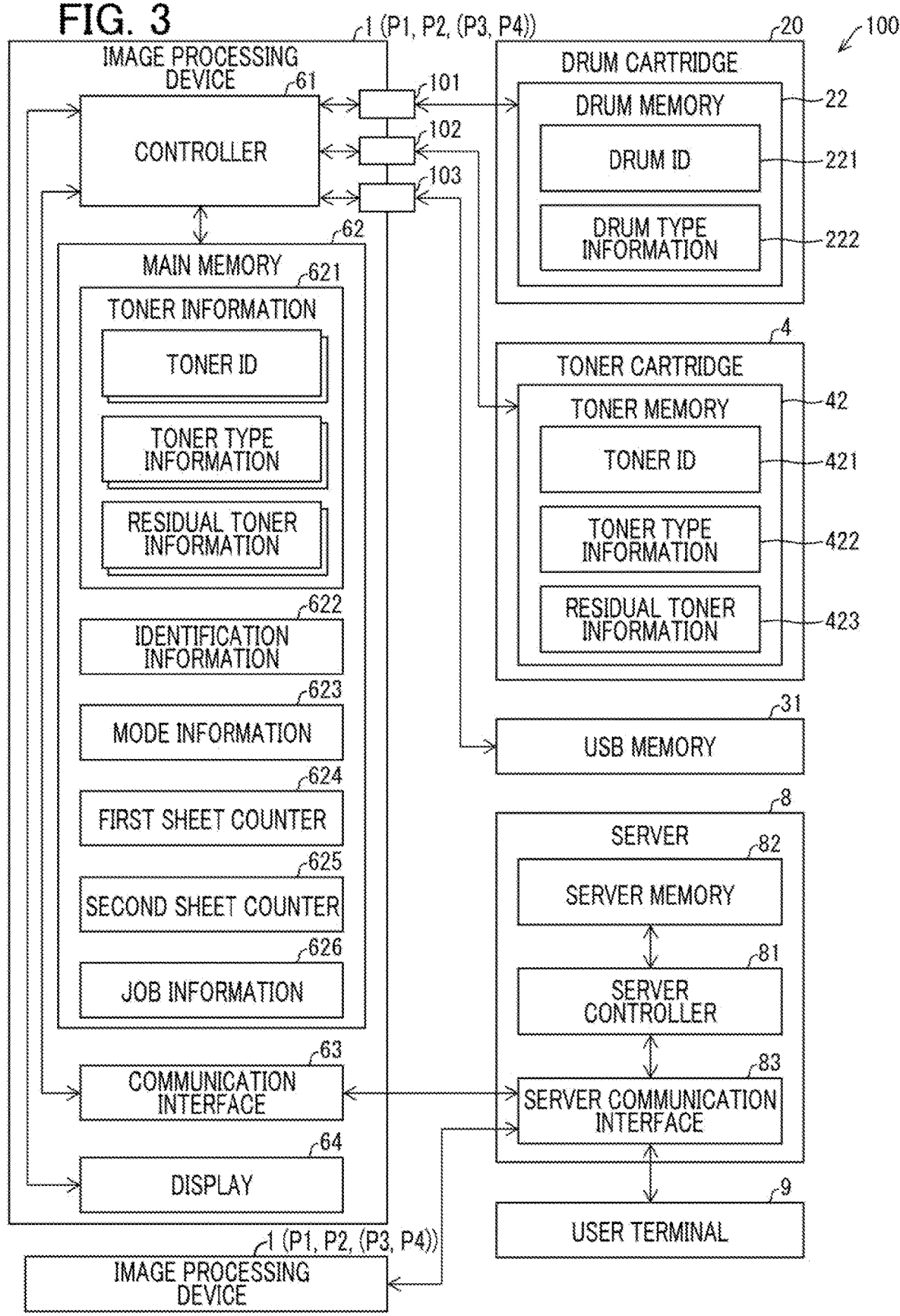
FIG. 3 is a block diagram illustrating relationships of connections among examples of image processing devices, a server, a user terminal, and a USB memory.

FIG. 2 is a schematic diagram of the image processing device 1. FIG. 3 shows the relationships of connections among the image processing devices 1 including their drum cartridges 20 and toner cartridges 4; the server 8; the user terminal 9; and a USB memory 31. While the image processing system 100 in the example of FIG. 3 includes two image processing devices 1, both image processing devices 1 have the same configuration.

As shown in FIG. 2, each image processing device 1 includes a main casing 10, a cover 11, toner cartridges 4, drum cartridges 20, a controller 61, a main memory 62, and a communication interface 63. The controller 61 is an example of a computer. The image processing device 1 may also be provided with a display 64 such as a liquid crystal display and lamps; and an input interface that includes buttons and the like. The liquid crystal display may also be integrally configured with a touchscreen to function as the input interface. The image processing device 1 also is provided with a USB connector 103. Further, the image processing device 1 is further provided with other connectors in which external memory can be mounted. The connectors are provided on the outer surface of the main casing 10, for example.

Main Casing 10

The toner cartridges 4 are mountable in the main casing 10 of the image processing device 1. As will be described later in detail, each toner cartridge 4 is mounted in a drum cartridge 20 to form an integral unit with the drum cartridge 20. While mounted in the corresponding drum cartridge 20, each toner cartridge 4 can then be mounted together with the corresponding drum cartridge 20 into the main casing 10, thereby achieving the image processing device 1 that includes the drum cartridges 20 and the toner cartridges 4.

Note that four toner cartridges 4 can be mounted in the image processing device 1 of the present embodiment in order to perform printing. In other words, the image processing device 1 according to the present embodiment is configured to accept four mounted drum cartridges 20 and four mounted toner cartridges 4. However, the numbers of drum cartridges 20 and toner cartridges 4 mounted in the image processing device 1 are not limited to the example of FIG. 2. For example, the image processing device 1 may be a monochrome printer that allows the mounting of a single drum cartridge 20 and a single toner cartridge 4.

Each toner cartridge 4 accommodates toner that is consumed when the image processing device 1 perform printing. In other words, for the image processing device 1, the toner cartridge 4 is an example of the consumable. Further, each drum cartridge 20 includes a photosensitive drum 21 that is used for printing on the image processing device 1. For the image processing device 1, the drum cartridge 20 is an example of the consumable.

The main casing 10 has a rectangular box shape, for example. The main casing 10 is configured to accommodate the four drum cartridges 20, the four toner cartridges 4, a transfer belt 70, the controller 61, the main memory 62, and the communication interface 63. The main casing 10 also has four cartridge retaining members (cartridge holders) 13. The cartridge retaining members 13 are formed as recesses that are open in the main casing 10. The drum cartridges 20 and toner cartridges 4 are retained in corresponding cartridge retaining members 13 when mounted in the main casing 10.

Cover 11

The cover 11 of the image processing device 1 is provided with a light source unit 50 for each of the drum cartridges 20. Thus, the image processing device 1 is provided with four light source units 50. The cover 11 can rotate (move) about a rotational shaft 11A between an open position depicted with solid lines in FIG. 2 for exposing an opening 10A, and a closed position depicted with two-dot chain lines in FIG. 2 for covering the opening 10A. The rotational shaft 11A extends in a first direction. Hence, the opening 10A formed in the top of the main casing 10 is opened and closed by the rotation of the cover 11.

Note that the "first direction" denotes a direction extending along the rotational axis of a developing roller 41 in the toner cartridge 4 (the developing roller axis). The openings of the cartridge retaining members 13 are exposed when the cover 11 is in the open position and are covered by the cover 11 when the cover 11 is in the closed position.

A cover sensor (not shown) is provided in the opening 10A. The cover sensor detects when the cover 11 is in the closed position. The cover sensor may be a contact-type sensor or an optical sensor, for example.

Toner Cartridges 4

Each toner cartridge 4 has a developing roller 41, and a cartridge case that can accommodate developer (e.g., toner). The cartridge case is mountable in the main casing 10. The four toner cartridges 4 accommodate developer in mutually different colors (e.g., the colors cyan, magenta, yellow, and black) as the material used for forming images. The developer is an example of the printing material.

The developer is a consumable that becomes depleted during use. The developing roller 41 is a cylindrical member that extends in the first direction and is rotatable about the developing roller axis extending in the first direction. When the toner cartridge 4 is mounted in the drum cartridge 20, the outer circumferential surface of the photosensitive drum 21 contacts the outer circumferential surface of the developing roller 41.

The toner cartridge 4 also has a toner memory 42 as an example of the consumable memory or the memory of the consumable. The toner cartridge 4 has the outer surface and the toner memory 42 is disposed on a part of the outer surface which is on one side (upstream side or downstream side) of the toner cartridge 4 in the first direction. The toner memory 42 allows the reading and writing of information. For example, the toner memory 42 may be flash read-only memory (flash ROM) or electrically erasable programmable read-only memory (EEPROM; Japanese registered trademark of Renesas Electronics Corporation).

The toner memory 42 has a first area 421, a second area 422, and a third area 423 for storing information related to the toner cartridge 4. The toner memory 42 stores a toner ID in the first area 421. The toner memory 42 stores toner type information in the second area 422. The toner memory 42 stores residual toner information in the third area 423. Note that data in the third area 423 is overwritable.

The toner ID specifies unique information for identifying an individual toner cartridge 4. The toner ID is an example of the second information. Here, the toner ID is a unique serial number for an individual toner cartridge 4. The toner ID may include information specifying the color of the toner cartridge 4.

The toner type information is an example of the type information specifying the type of the toner cartridge 4. There are two types of toner cartridges 4 in the present embodiment. The first type is a "special cartridge" that can be used only on a subject of the agreement (a subscribed device). In other words, a special cartridge is an example of a special consumable that can be used when the user has concluded an agreement for the image processing device 1.

The second type is a "normal cartridge" that can be used on any image processing device 1, including image processing devices 1 that are not subjects of the agreement (subscribed devices). In other words, the normal cartridge is an example of a normal consumable that can be used in the image forming devices regardless of whether an agreement has been entered for the image forming devices. Note that the toner type information may also be included in the toner ID. That is, the toner ID may simultaneously be information identifying an individual toner cartridge 4 and information specifying the type of the toner cartridge 4.

The residual toner information indicates the residual quantity of toner in the toner cartridge 4. In this example, the residual quantity of toner is a value associated with one of a plurality of levels from full to empty. This value is stored in the third area 423. The residual quantity level of toner stored in the toner memory 42 may be a character string such as "FULL", "HIGH", "LOW", "EMPTY", and the like; may be a numerical value such as a value from "100%" to "0%"; or may be information combining a character string with a numerical value.

Drum Cartridges 20

Each drum cartridge 20 has a cartridge case that is mountable in the main casing 10. The cartridge case includes a photosensitive drum 21 as a component used for image formation. As the photosensitive drum 21 is used, the surface of the photosensitive drum 21 wears or otherwise degrades, requiring the photosensitive drum 21 to be replaced. That is, the photosensitive drum 21 is a consumable. The photosensitive drum 21 is a cylindrical photosensitive member extending in the first direction. The photosensitive drum 21 can rotate about a drum roller shaft extending in the first direction. The outer circumferential surface of the photosensitive drum 21 is covered by a photosensitive material.

The drum cartridge 20 also has a drum memory 22 as an example of the consumable memory or the memory of the consumable. The drum memory 22 allows the reading and writing of information. The drum memory 22 is flash ROM or EEPROM, for example.

The drum memory 22 has a first area 221 and a second area 222 which are for storing information related to the photosensitive drum 21 of the drum cartridge 20. The drum memory 22 stores a drum ID in the first area 221. The drum memory 22 stores drum type information in the second area 222.

The drum ID is an example of the second information and represents unique information for identifying an individual drum cartridge 20. The drum ID is a unique serial number identifying a single drum cartridge 20 in this example. The drum type information is an example of type information specifying the type of the drum cartridge 20. There are two types of drum cartridges 20 in the present embodiment: a "special cartridge" and a "normal cartridge." The drum type information may also be included in the drum ID. That is, the drum ID may simultaneously be information identifying an individual drum cartridge 20 and information specifying the type of the drum cartridge 20.

Mounting of Cartridges and the Printing Mechanism

As shown in FIG. 2, the drum cartridges 20 and toner cartridges 4 are mounted in the main casing 10 while the cover 11 is in the open position. In this state, the drum cartridges 20 and toner cartridges 4 are inserted through the opening 10A into the corresponding cartridge retaining members 13.

The main casing 10 also has four connectors 101 and four connectors 102. The four connectors 101 respectively correspond to the four drum cartridges 20 and the four connectors 102 respectively correspond to the four toner cartridges 4. When the drum cartridge 20 is inserted into the corresponding cartridge retaining member 13, the corresponding connector 101 becomes electrically connected to the drum memory 22 of the inserted drum cartridge 20, enabling the controller 61 to communicate with the drum memory 22. Further, while the toner cartridge 4 is mounted in the main casing 10, the connector 102 is electrically connected to the toner memory 42 of the toner cartridge 4 mounted in the main casing 10, enabling the controller 61 to communicate with the toner memory 42 of the toner cartridge 4.

The four light source units 50 are mounted on the inner surface of the cover 11. The light source units 50 are arranged to confront the top surfaces of the photosensitive drums 21 when the drum cartridges 20 are mounted in the main casing 10 and the cover 11 is in the closed position. Each light source unit 50 has a plurality of light sources aligned in the first direction. The light sources can irradiate light onto the outer circumferential surface of the corresponding photosensitive drum 21. The light sources are light-emitting diodes (LEDs), for example.

Each light source unit 50 is electrically connected to the controller 61. The controller 61 controls the light sources of each light source unit 50 to emit light based on inputted image data. The light sources irradiate light toward the outer circumferential surfaces of the photosensitive drums 21. As a result, the photosensitive material on the outer circumferential surfaces of the photosensitive drums 21 is exposed according to the image data.

The transfer belt 70 is a component that transfers developer present on the surfaces of the photosensitive drums 21 onto a printing paper. The transfer belt 70 is a belt having an annular shape (an endless belt). The outer circumferential surfaces of the photosensitive drums 21 can contact the outer surface of the transfer belt 70. During a printing process, printing paper is conveyed between the transfer belt 70 and the photosensitive drums 21.

The transfer belt 70 is stretched around a drive roller 71 and a follow roller 72. The drive roller 71 drives the transfer belt 70 to circulate. The controller 61 controls the drive roller 71 to rotate. The follow roller 72 rotates along with the movement of the transfer belt 70 driven by the drive roller 71.

Internal Structure of the Main Casing

The controller 61 has an application-specific integrated circuit (ASIC), for example. The controller 61 is electrically connected to the main memory 62, the communication interface 63, and the display 64 provided in the main casing 10. The controller 61 executes various processes for controlling the image processing device 1 to perform a printing process and related processes.

The controller 61 may also be provided with a processor, such as a central processing unit (CPU). In this case, a control program for implementing a print control method may be stored in the main memory 62. A printing process on the image processing device 1 may be executed by the processor of the controller 61 performing operations according to the control program stored in the main memory 62.

The controller 61 itself may also be provided with a computer-readable storage medium that stores the control program. The storage medium may be a "non-transitory, tangible medium," such as read-only memory (ROM), a tape, a disc, a card, semiconductor memory, or a programmable logic circuit. Random-access memory (RAM) or the like may also be used for developing the control program.

The control program may also be supplied to the computer via any transmission medium (a communication network, broadcast waves, etc.) capable of transmitting the control program. Note that one aspect of this disclosure is that the control program can be implemented in the form of data signals embedded in a carrier wave, as embodied in electronic transmission.

When the drum cartridge 20 and toner cartridge 4 are mounted in the corresponding cartridge retaining member 13 of the main casing 10, the drum memory 22 and toner memory 42 are electrically connected to the controller 61, as illustrated in FIG. 3. The controller 61 can execute a read process for reading information from the connected drum memory 22 and toner memory 42, and a write process and/or an overwrite process for writing or overwriting information to the drum memory 22 and toner memory 42.

As shown in FIG. 3, the image processing device 1 has the USB connector 103 as an example of the connector. The USB connector 103 is provided on the outer surface of the main casing 10, for example. When a USB memory 31 is inserted into the USB connector 103 from outside the main casing 10, the USB connector 103 becomes electrically connected to the USB memory 31. This connection allows the controller 61 to perform a process for reading information from the USB memory 31. Further, while the USB connector 103 is electrically connected to the USB memory 31, the controller 61 can execute a process for writing information to the USB memory 31 and a process for deleting written information from the USB memory 31.

The USB memory 31 is an example of the external memory. Other examples of the external memory include Secure Digital (SD) cards and external hard disk drives. The USB connector 103 is an example of the first connector. Thus, the image processing device 1 may also possess an SD card slot for inserting SD cards or a connector for connecting to an external hard disk drive.

The main memory 62 allows the reading and/or writing of information. The main memory 62 is flash ROM, EEPROM, or non-volatile random-access memory (NVRAM), for example. The main memory 62 has a first area 621 that stores toner information, a second area 622 that stores pieces of identification information, a third area 623 that stores mode information, a fourth area 624 that stores a first sheet counter, a fifth area 625 that stores a second sheet counter, and a sixth area 626 that stores job information transmitted from the user's PC or another device. The main memory 62 is an example of the memory storing the job information specifying one or more jobs related to corresponding image processes. The job information specifies one or more jobs each being to execute a corresponding image process. The PC of the user is an example of the external terminal.

The toner information is information related to each toner cartridge 4 mounted in the image processing device 1. For example, the toner information may be data associating a toner ID read from a certain toner memory 42 with toner type information and residual toner information read from the same toner memory 42. The main memory 62 may store this associated data in the first area 621 for each toner cartridge 4.

The piece of identification information stored in the second area 622 is information related to the image processing device 1 and specifically information used to identify the image processing device 1. The piece of identification information may be a device ID unique to each image processing device 1. Alternatively, the piece of identification information may be a group ID assigned commonly to a plurality of image processing devices 1 that meets specific conditions. Hereinafter, a piece of identification information for identifying an image processing device 1 or identifying a group to which the image processing device 1 belongs may be referred to as the piece of identification information for the image processing device 1. The main memory 62 may store a plurality of pieces of identification information for identifying a plurality of image processing devices.

The mode information indicates the operating mode of the image processing device 1. In the present embodiment, the mode information indicates one of two modes: a "subscription mode" specifying that the image processing device 1 is currently registered as a subject of the agreement (a subscribed device), and a "normal mode" specifying that the image processing device 1 is not currently registered as a subject of the agreement (not the subscribed device) or that the agreement for the image processing device 1 has been cancelled.

In other words, "subscription mode" specifies that the image processing device 1 operates in the image processing system 100 as a subject of the agreement (a subscribed device under the agreement). "Normal mode" specifies that the image processing device 1 is not a subject of the agreement (not a subscribed device) and operates as a normal image processing device having no agreement or contract. The controller 61 overwrites the mode information as needed.

The first sheet counter indicates the cumulative number of sheets printed on the image processing device 1. The second sheet counter indicates the number of sheets that have been printed by the image processing device 1 in subscription printing. The count of the second sheet counter may be reset to 0 each time the image processing device 1 transitions from the subscription mode to the normal mode or may indicate the cumulative number of sheets that have been printed to date on the image processing device 1 under an agreement.

The job information is information that has been transmitted from a user's PC or other device and inputted through the communication interface 63. The job information includes one or more jobs related to corresponding image processes. That is, each job is to execute the corresponding image process. A job related to an image process may be a print job, for example. The image processing device 1 can perform printing based on print data specified by a print job on a print medium by controlling the various components of the image processing device 1. Specifically, the controller 61 controls the image processing device 1 to perform a printing process and processes related to the printing process by executing various processes based on the print job. Alternatively, the job information may be information for specifying one or more jobs, such as job IDs assigned to corresponding jobs each related to an image process. In this case, jobs related to the image processes may be stored on the server 8 or the like.

The communication interface 63 is an interface that conducts communications between the image processing device 1 and the server 8. The communication interface 63 outputs various data, notifications, and requests received from the server 8 to the controller 61. The communication interface 63 also transmits various data, notifications, and requests inputted from the controller 61 to the server 8. That is, the communication interface 63 may be an inter-device interface, or data transferring interface enabling the controller 61 to be connected to other devices, or a network interface.

User Terminal 9

The user terminal 9 has an input interface for receiving various input operations performed by the user, and a communication interface for communicating with the server 8. The user registers a subscribed device on the server 8 through input operations performed on the user terminal 9. For example, the user inputs the user's own piece of identification information (the user ID) and the piece of identification information (the device ID) for the image processing device 1 that the user wishes to register as a subscribed device into the user terminal 9. Upon receiving this input, the user terminal 9 transmits to the server 8 the inputted the user's own piece of identification information (the user ID) and the inputted piece of identification information (the device ID) for the image processing device 1.

In addition to input operations for registering a subscribed device (or, for adding a subscribed device), the user terminal 9 may receive input operations for replacing a subscribed device. For example, the user terminal 9 may receive input operations performed by the user to input the user's own piece of identification information (the user ID), the piece of identification information (the device ID) for the new subscribed device, and the piece of identification information for the current subscribed device. Subsequently, the user terminal 9 may transmit these three pieces of information to the server 8.

Server 8

The server 8 is a management device that manages the operating status of image forming devices 1. The server 8 is provided with a server communication interface 83, a server memory 82, and a server controller 81. The server controller 81 is a CPU that performs overall control of the server 8. The server memory 82 is a storage that stores data required for the operations of the server 8.

The server controller 81 updates a registration table stored in the server memory 82 on the basis of notifications or requests received from the image forming devices 1. The "registration table" is a data table storing data indicating image forming devices 1 that have been designated subjects of the agreement (subscribed devices) by users or servers, as will be described later. The registration table records a piece of identification information for identifying a user (a user ID) in association with a piece of identification information (a device ID) for each device of a subject of the agreement (or each subscribed device). The registration table is also data indicating whether the subscription for each subscribed device is currently active or not. In other words, the registration table specifies each image processing device that is the subject of the agreement for each user.

The server communication interface 83 is an interface for conducting communications between the server 8 (the server controller 81) and the image forming devices 1. The server communication interface 83 outputs various data, notifications, and requests received from image forming devices 1 to the server controller 81. The server communication interface 83 also transmits various data, notifications, and requests inputted from the server controller 81 to the image forming devices 1.

For example, the server communication interface 83 may receive a piece of identification information (a device ID) and value of the first sheet counter and/or value of the second sheet counter from the image processing device 1 and may output these values to the server controller 81. The server controller 81 may also store an inputted piece of identification information (an inputted device ID) and value of the first sheet counter and/or value of the second sheet counter in association with each other in the server memory 82 as device information for the image processing device 1.

Transferring Print Jobs from an Old Device to a New Device

Hereinafter, the image processing device 1 that the user currently uses will be called the "old device." The old device has a subscription mode indicating that the image processing device 1 is currently registered as a subject of the agreement (a subscribed device) on the server 8 according to operation or instruction by the user, and a normal mode indicating that the image processing device 1 is not currently registered as a subject of the agreement on the server 8 according to operation or instruction by the user or that the subscription for the image processing device 1 has been canceled according to operation or instruction by the user. In the following description, an old device 1 registered as a subject of the agreement (a subscribed device) will be referred to as a first image processing device P1 (or, printer P1) in the subscription mode, and an old device not currently registered as a subject of the agreement or whose agreement has been cancelled will be referred to as a first image processing device P1 (printer P1) in the normal mode. The first image processing device P1 as the old device is an example of the first image processing device for which the agreement is concluded. The first image processing device P1 as the old device is an example of the first image processing device being currently the subject of the agreement. In the following description, an ordinal numeral "first" may be added components in the first image processing device P1. For example, the controller 61, the main memory 62, the communication interface 63, and the display 64 in the first image processing device P1 may be described respectively as the first controller 61, the first main memory 62, the first communication interface 63, and the first display 64. That is, the first image processing device P1 includes the first controller 61, the first main memory 62, the first communication interface 63, and the first display 64. The area 622 of the first main memory 62 stores a piece of identification information (device ID) for the first image processing device P1.

Further, the image processing device 1 that the user intends to use in place of the old device will be called the "new device." The new device has a subscription mode indicating that the image processing device 1 is currently registered as a subject of the agreement (a subscribed device) on the server 8 according to operation or instruction by the user and a normal mode indicating the image processing device 1 not registered as a subject of the agreement on the server 8 according to operation or instruction by the user or whose agreement 1 has been canceled according to operation or instruction by the user. In the following description, a new device currently registered as a subject of the agreement (a subscribed device) will be referred to as a second image processing device P2 (printer P2) in the subscription mode, and a new device not currently registered as a subject of the agreement or whose subscription has been canceled will be referred to as a second image processing device P2 (printer P2) in the normal mode. The second image processing device P2 as the new device is an example of the second image processing device to newly become a subject of the agreement or a subscribed device as replacement for the first image processing device. The second image processing device P2 is an example of the second image processing device replacing the first image processing device P1 as the subject of the agreement. In the following description, an ordinal numeral "second" may be added components in the second image processing device P2. For example, the controller 61, the main memory 62, the communication interface 63, and the display 64 in the second image processing device P2 may be described as the second controller 61, the second main memory 62, the second communication interface 63, and the second display 64. That is, the second image processing device P2 includes the second controller 61, the second main memory 62, the second communication interface 63, and the second display 64. The area 622 of the second main memory 62 stores a piece of identification information (device ID) for the second image processing device P2.

Figure 4:
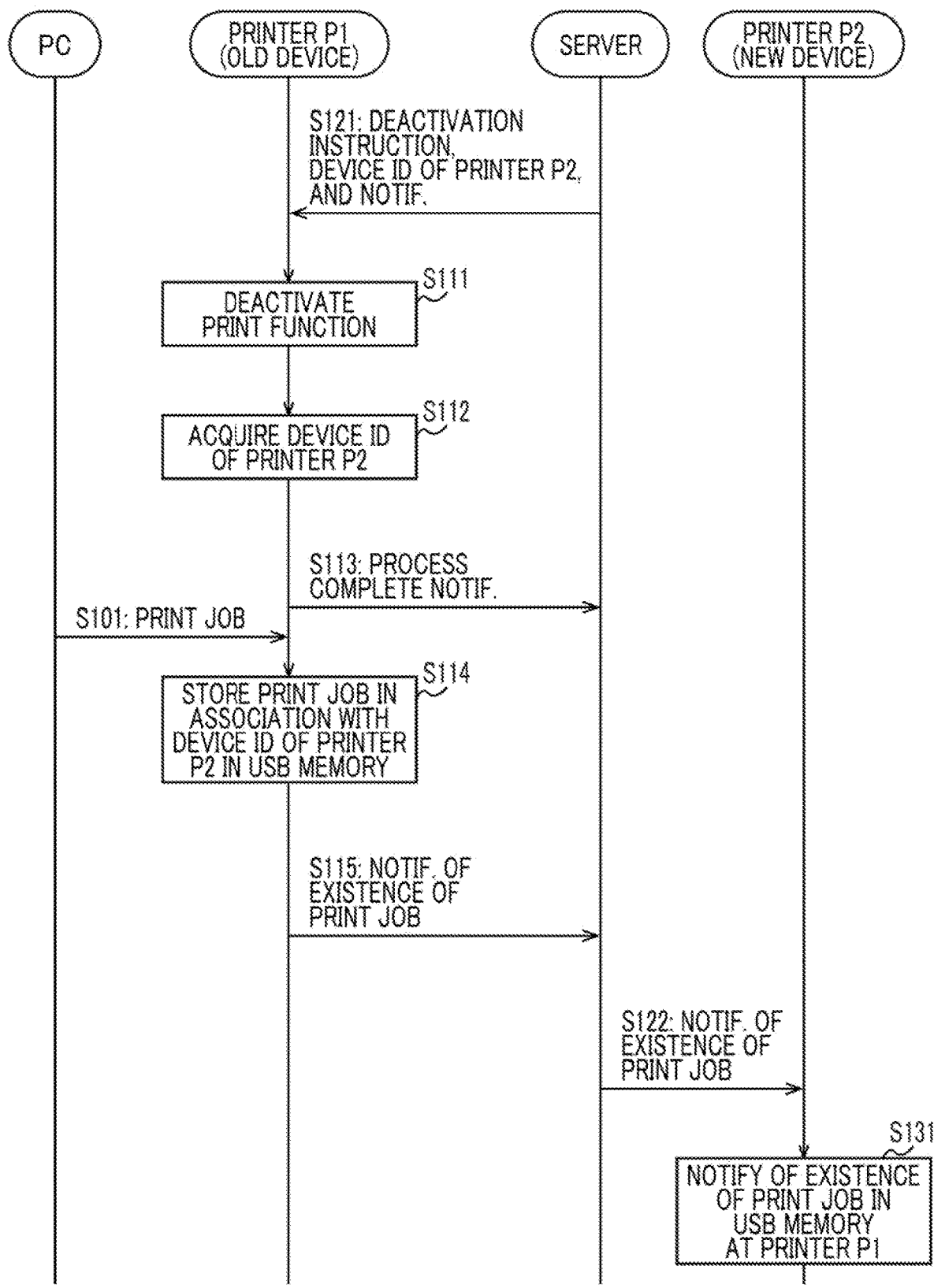
FIG. 4 is a sequence diagram illustrating operations of devices in the image processing system.

FIG. 4 is a sequence diagram showing sample operations performed by the various devices in the image processing system 100. The process shown FIG. 4 is performed while replacing the first processing device P1 as the subject of the agreement to the second processing device P2. The process of FIG. 4 and the processes of FIGS. 5-7 described later show the method for transferring a job to execute an image process, while replacing the first processing device P1 with the second image processing device P2. In other words, the processes shown in FIGS. 4-7 shows the method for transferring a job to execute an image process while changing the subject of the agreement from the first processing device P1 to the second image processing device P2.

For example, consider a case in which the first image processing device P1 malfunctions while in the subscription mode. In this case, components related to control in the first image processing device P1 may operate normally. Here, the components related to control may include the first controller 61, the first main memory 62, the first communication interface 63. Further, the components related to control may include the first display 64. When the first image processing device P1 malfunctions, the user may perform an input operation on the user terminal 9 to report this malfunction of the first image processing device P1. Upon receiving this input operation, the user terminal 9 notifies the server 8 of the malfunction.

When the server 8 receives the notification that the first image processing device P1 has malfunctioned, the service provider managing the server 8 arranges for a second image processing device P2 to be sent to the address of the user of the first image processing device P1. The service provider of the server 8 also registers a piece of identification information (device ID) for the second image processing device P2 in the registration table stored on the server 8. Specifically, the server controller 81 acquires a piece of identification information (a device ID) for the second image processing device P2 from the service provider of the server 8. The server controller 81 updates the registration table by associating the piece of identification information (the device ID) for the second image processing device P2 with the identification information for the user of the first image processing device P1. As a result, the piece of identification information (the device ID) for the first image processing device P1 and the piece of identification information (the device ID) for the second image processing device P2 are associated with the piece of identification information for the user (the user ID). The second image processing device P2 is then delivered to the user. At this time, the second image processing device P2 is set to the subscription mode.

FIG. 4 shows an example of operations performed by devices in the image processing system 100 after the service provider of the server 8 has arranged for a second image processing device P2 to be sent to the address of the user of the first image processing device P1.

After the server controller 81 of the server 8 has registered the piece of identification information (the device ID) for the second image processing device P2 received from the service provider of the server 8 in the registration table on the server 8, in S121 the server controller 81 transmits a function deactivation instruction to the first image processing device P1 via the server communication interface 83 requesting the first image processing device P1 to deactivate the print function of the first image processing device P1. The print function is an example of the prescribed function of the image processing device 1. Further, after sending the function deactivation instruction, in S121 the server controller 81 also transmits a piece of identification information (a device ID) for the second image processing device P2, with which the first image processing device P1 is to be replaced, to the first image processing device P1 via the server communication interface 83.

Upon receiving the function deactivation instruction from the server 8 via the communication interface 63, in S111 the first controller 61 of the first image processing device P1 deactivates the print function. Next, in S112 the first controller 61 acquires the piece of identification information (the device ID) for the second image processing device P2 from the server 8 via the first communication interface 63 and stores the piece of identification information (the device ID) for the second image processing device P2 in the first main memory 62. In other words, prior to the first controller 61 acquiring the piece of identification information for the second image processing device P2, the first controller 61 receives the function deactivation instruction to deactivate a prescribed function of the first image processing device P1. In this case, the first controller 61 stores the piece of identification information (the device ID) for the second image processing device P2 in the first main memory 62 in a manner that the piece of identification information (the device ID) for the second image processing device P2 can be distinguished from the piece of identification information (the device ID) for the first image processing device P1. For example, the first controller 61 stores the piece of identification information (the device ID) for the second image processing device P2 in an area of the first memory 62 different from the area 622. The process to acquire the piece of identification information (the device ID) for the second image processing device P2 is an example of the process for acquiring the piece of identification information. The processes in S111 and S112 may be executed in parallel. The step acquiring the piece of identification information (the device ID) for the second image processing device P2 is an example of the step for acquiring the piece of identification information.

Following step S111, in S113 the first controller 61 of the first image processing device P1 transmits, to the server 8 via the first communication interface 63, a process complete notification notifying the server 8 that the print function has been deactivated. When the server 8 receives the process complete notification, the server 8 may register the second image processing device P2 as the subject of the agreement and exclude the first image processing device P1 from the subject of the agreement. In other words, in S113 the subject of the agreement may be changed from the first image processing device P1 to the second image processing device P2.

When in S101 a print job is transmitted to the first image processing device P1 from the user's PC or the like, the first controller 61 of the first image processing device P1 receives the print job via the communication interface 63. In other words, subsequently to the first controller 61 storing the acquired piece of identification information for the second image processing device P2, the first controller 61 acquires the job as an example of the job information. The first controller 61 receives the job to execute an image process subsequently to the acquiring the function deactivation instruction. However, since the process to deactivate the print function was executed in S111, the first image processing device P1 can no longer execute printing processes.

When the first controller 61 of the first image processing device P1 receives a print job after the print function was deactivated in S111, the first controller 61 controls the first display 64 to display a notification prompting the user to connect (or insert) an external memory into the connector of the first image processing device P1. The first display 64 is an example of the display. Notifying the user of the timing to mount the external memory into the connector in this way ensures that the job will be promptly transferred to the second image processing device P2. In this example, the user of the first image processing device P1 mounts the USB memory 31 in the first USB connector 103 of the first image processing device P1.

In a case that one or more print jobs are received via the communication interface 63 after completing the process of S111, in S114 the first controller 61 of the first image processing device P1 stores the received one or more print jobs in the USB memory 31 so that the one or more print jobs are associated with the piece of identification information (the device ID) for the second image processing device P2 stored in the first main memory 62. In other words, subsequently to receiving the job, the first controller 62 stores the piece of identification information and the job as an example of the job information in the USB memory 31 as an example of the external memory connected to the connector 103 of the first image processing device P1. Here, the job information indicates the job. The process of S114 is an example of the process for storing. In S114 the first controller may encrypt the piece of identification information (the device ID) for the second image processing device P2 and then store the encrypted piece of identification information (the encrypted device ID) in the USB memory 31 so that the one or more print jobs are associated with the encrypted piece of identification information (the encrypted device ID). Encrypting the piece of identification information (the device ID) for the second image processing device P2 reduces the possibility of the piece of identification information (the device ID) being rewritten.

Following the process of S114, in S115 the first controller 61 of the first image processing device P1 may send to the server 8 a notification indicating the existence of a print job that has not been printed on the first image processing device P1 (or indicating the existence of a print job unprinted on the first image processing device P1). When the server 8 receives the notification indicating the existence of a print job that has not been printed on the first image processing device P1, the server 8 may determine on the basis of this notification that the process of S114 to store the one or more print jobs and the piece of identification information (the device ID) for the second image processing device P2 in the USB memory 31 has been completed. This notification indicating the existence of a print job that has not been printed on the first image processing device P1 is an example of the storing completion information. Alternatively, the notification may further indicate completion of the process of S114 to store the one or more print jobs and the piece of identification information (the device ID) for the second image processing device P2 in the USB memory 31. This notification to indicate completion of the process of S114 is an example of the storing completion information. In other words, subsequently to both the first controller 61 storing the acquired piece of identification information for the second image processing device P2 and the first controller 61 acquiring the job as an example of the job information, the first controller 61 may send, to the server 8, a completion notification indicating that the first controller 61 storing the acquired piece of identification information and the first controller 61 acquiring the job information 61 are both completed.

Upon receiving a notification indicating a print job has not been printed on the first image processing device P1, the server 8 determines whether the second image processing device P2 delivered to the user is detected via the network NT. When the server 8 detects the second image processing device P2 via the network NT, in S122 the server 8 sends a notification to the second image processing device P2 indicating the existence of a print job that has not been printed on the first image processing device P1. This notification is an example of an instruction to display on a display a notification to prompt the user to connect, to the connector of the second image processing device P2, the external memory mounted on the connector of the first image processing device P1. In S122 the server 8 may send a notification to prompt the user to connect, to the connector of the second image processing device P2, the external memory mounted on the connector of the first image processing device P1. In other words, the second controller 61 may receive from the server 8 a notification prompting a user to connect the external memory to the connector 103 of the second image processing device P2 via a second communication interface 63 of the second image processing device P2. Here, the notification is sent to the second image processing device P2 from the server 8 subsequently to reception of the completion notification by the server 8.

The second controller 61 of the second image processing device P2 receives the notification indicating the existence of a print job that has not been printed on the first image processing device P1. The second controller 61 of the second image processing device P2 is an example of the second controller. Thereafter, in response to receiving this notification, in S131 the second controller 61 may control the second display 64 of the second image processing device P2 to display a notification prompting the user to insert the external memory, which has been mounted in the connector of the first image processing device P1, into the connector of the second image processing device P2. This notification may further notify the user of existence of the print job in the USB memory mounted in the image processing device P1. The followings (i) and (ii) are some sample contents that can be displayed on the second display 64.

(i) A notification that the USB memory connected to the old printer contains print data
(ii) A notification that this print data can be printed on the new printer by connecting the USB memory to the new printer Notifying the user of the timing to mount the USB memory 31 in the second image processing device P2 in this way ensures that the job will be promptly transferred to the second image processing device P2.

Further, after completing the process in S114, the first controller 61 of the first image processing device P1 may control the first display 64 to display a notification prompting the user to mount the USB memory 31, which has been mounted in the first USB connector 103 of the first image processing device P1, into the second USB connector 103 of the second image processing device P2. Notifying the user of the timing to mount the USB memory 31 in the second image processing device P2 in this way ensures that the job will be promptly transferred to the second image processing device P2.

Thus, after confirming the notification displayed on the first display 64 of the first image processing device P1 or the second display 64 of the second image processing device P2, the user removes the USB memory 31 from the first USB connector 103 of the first image processing device P1 and mounts the USB memory 31 into the second USB connector 103 of the second image processing device P2.

The first controller 61 of the first image processing device P1 is an example of the first controller. The first communication interface 63 of the first image processing device P1 is an example of the first communication interface. The first USB connector 103 of the first image processing device P1 is an example of the first connector. The second controller 61 of the second image processing device P2 is an example of the second controller. The second communication interface 63 of the second image processing device P2 is an example of the second communication interface. The second USB connector 103 of the second image processing device P2 is an example of the second connector.

Sample Steps in the Process Performed on the First Image Processing Device P1

Figure 5:
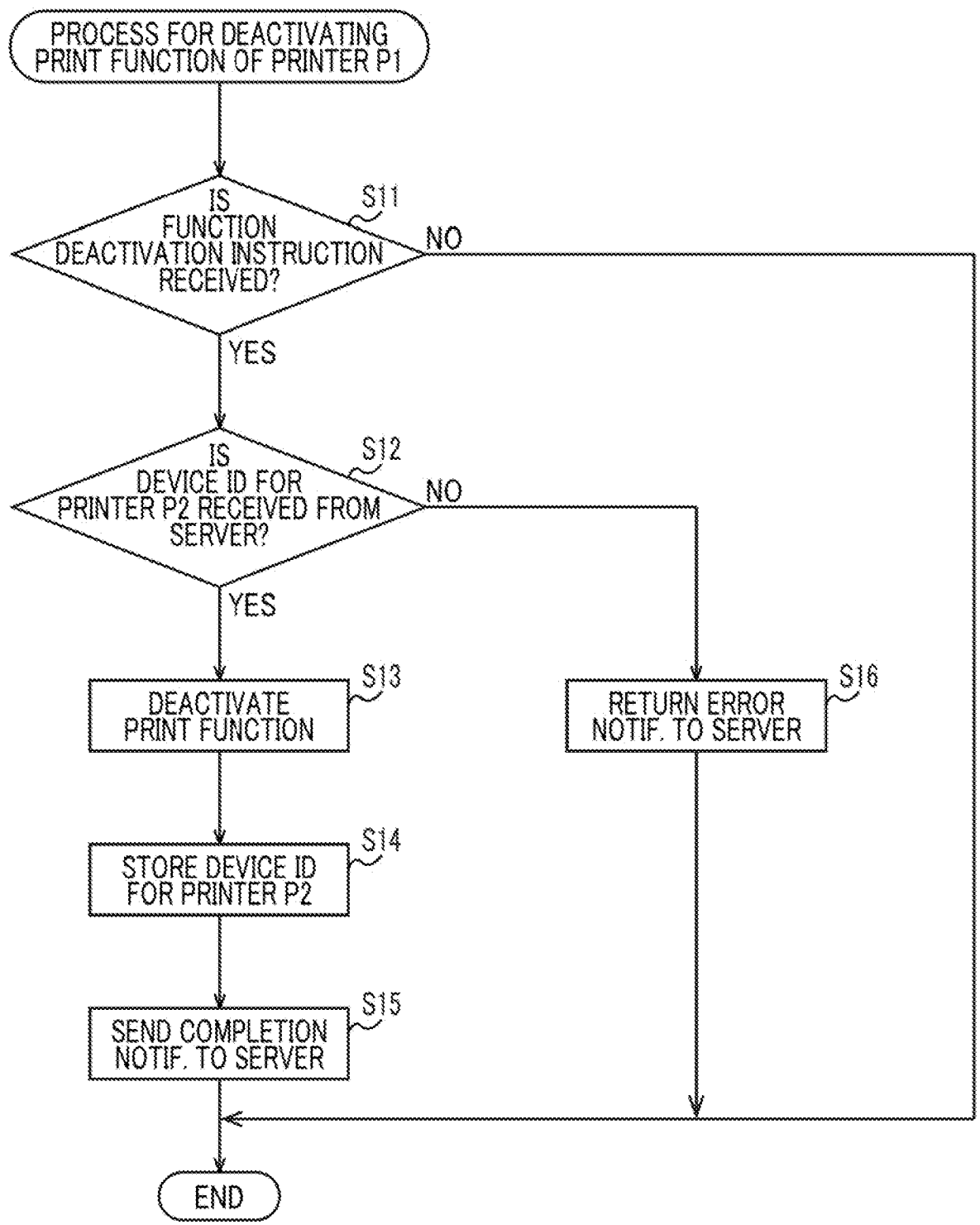
FIG. 5 is a flowchart illustrating a process executed by the image processing device.
Figure 6:
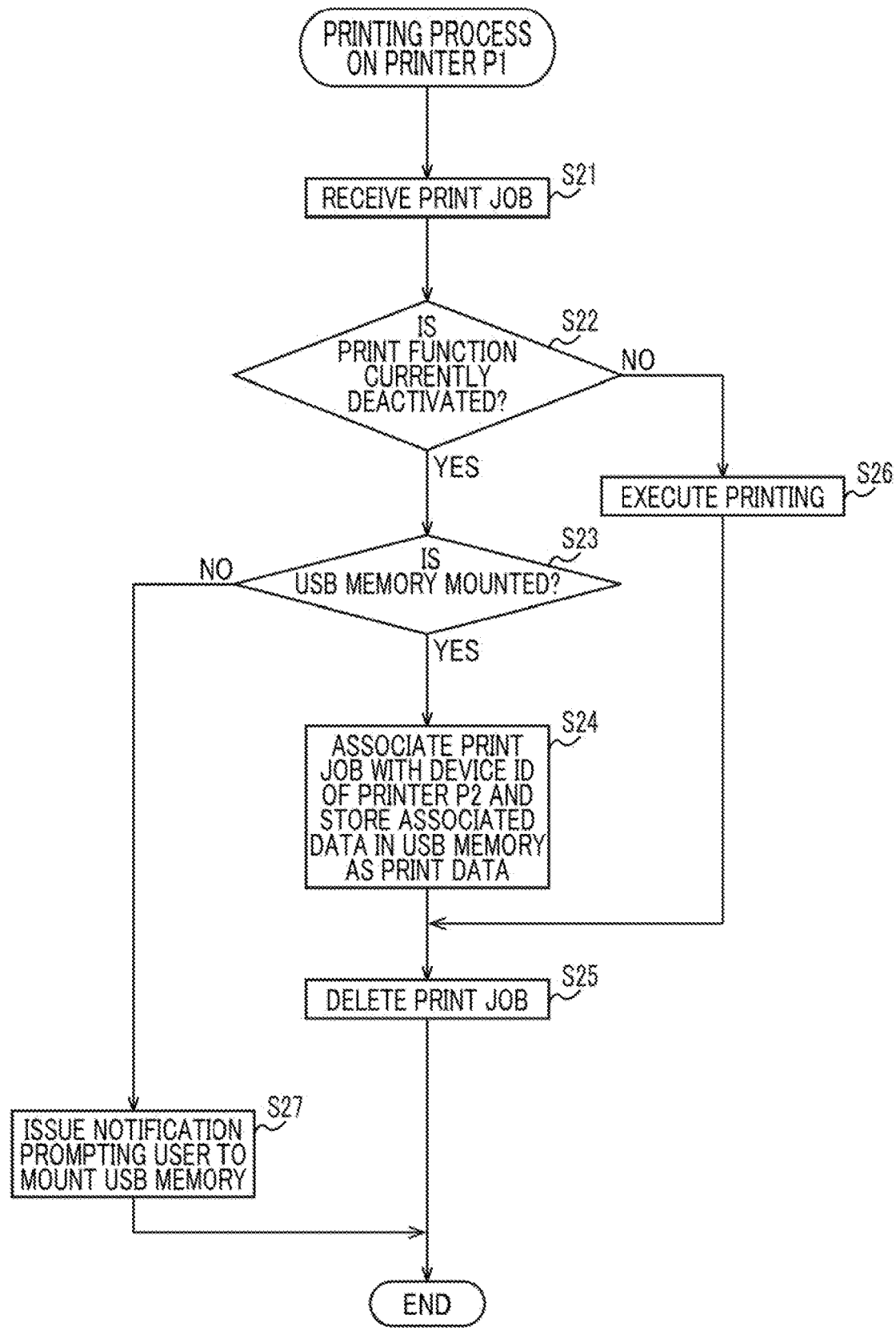
FIG. 6 is a flowchart illustrating a process executed by the image processing device.

FIGS. 5 and 6 are flowcharts showing sample steps in the process performed on the image processing device 1 serving as the first image processing device P1 in the example of operations on the image processing system 100 described in FIG. 4.

Process for Deactivating the Print Function of the First Image Processing Device P1

FIG. 5 is a flowchart showing sample steps for a process to deactivate the print function of the first image processing device P1. The process in FIG. 5 corresponds to the process performed in steps S111-S113 of FIG. 4.

In S11 at the beginning of FIG. 5, the first controller 61 of the first image processing device P1 determines whether a function deactivation instruction has been received from the server 8. When a function deactivation instruction has been received (S11: YES), in S12 the first controller 61 determines whether a piece of identification information (a device ID) for the second image processing device P2, with which the first image processing device P1 is replaced, has been received from the server 8. When the first controller 61 determines that the piece of identification information (the device ID) for the second image processing device P2 has been received (S12: YES), in S13 the first controller 61 deactivates the print function by controlling the components of the first image processing device P1.

In S14 the first controller 61 stores the piece of identification information (the device ID) for the second image processing device P2 received from the server 8 in the first main memory 62. In this case, the first controller 61 stores the piece of identification information (the device ID) for the second image processing device P2 in the first main memory 62 in a manner that the piece of identification information (the device ID) for the second image processing device P2 can be distinguished from the piece of identification information (the device ID) for the first image processing device P1 stored in the area 622. Note that the processes in steps S13 and S14 may be executed in parallel.

After completing the processes in S13 and S14, in S15 the first controller 61 sends a completion notification to the server 8 indicating that the process for deactivating the print function has been completed.

On the other hand, when a function deactivation instruction has not been received from the server 8 (S11: NO), the first controller 61 ends the process of FIG. 5. Further, when the first controller 61 determines in S12 that the piece of identification information (the device ID) for the second image processing device P2 has not been received from the server 8 (S12: NO), in S16 the first controller 61 sends an error notification to the server 8 and subsequently ends the process in FIG. 5.

Printing Process on the First Image Processing Device P1

FIG. 6 is a flowchart showing sample steps in a printing process performed on the first image processing device P1. The process in FIG. 6 corresponds to the process in steps S114 and S115 of FIG. 4.

When the first controller 61 receives a print job from the user's PC via the communication interface 63, in S21 of FIG. 6 the first controller 61 stores the print job in the main memory 62.

In S22 the first controller 61 determines whether the print function of the first image processing device P1 is currently deactivated. When the first controller 61 determines that the print function has been deactivated (S22: YES), in S23 the first controller 61 determines whether the USB memory 31 is mounted in the first USB connector 103 of the first image processing device P1.

When the first controller 61 determines that the USB memory 31 is mounted in the first USB connector 103 (S23: YES), in S24 the first controller 61 associates the print job received in S21 with the piece of identification information (the device ID) for the second image processing device P2 stored in the first main memory 62 and stores the associated data (the print job and the piece of identification information (the device ID) associated with each other) in the USB memory 31 as a set of print data.

After storing the print data in the first USB memory 31, in S25 the first controller 61 deletes the print job from the first main memory 62 and ends the printing process. In S25 the first controller 11 of the first image processing device P1 may control the first display 63 of the first image processing device P1 to display the notification to prompt the user to connect, to the connector of the second image processing device P2, the external memory which is or has been mounted on the connector of the first image processing device P1. In other words, subsequently to the first controller 61 acquiring the job as an example of the job information, the first controller 61 may control a display 64 of the first image processing device P1 to display a notification prompting a user to connect the external memory to the connector 103 of the second image processing device P2.

When the first controller 61 determines in S22 that the print function has not been deactivated (S22: NO), in S26 the first controller 61 controls the components of the first image processing device P1 to execute printing based on the print job received in S21. After completing the printing, in S25 the first controller 61 deletes the print job from the first main memory 62 and ends the printing process.

On the other hand, when the first controller 61 determines in S23 that the USB memory 31 is not mounted in the first USB connector 103 (S23: NO), in S27 the first controller 61 issues a notification prompting the user to mount the USB memory 31 in the first USB connector 103 of the first image processing device P1. For example, the first controller 61 may control the first display 64 to display a notification prompting the user to connect USB memory to the first USB connector. In other words, in a case that the first controller has received the job (as an example of job information) subsequently to the first controller 611 acquiring the piece of identification information for the second image processing device P2, in S27 the first controller 61 may control a display 64 of the first image processing device P1 to display a notification prompting a user to connect the external memory to the connector 103 of the first image processing device P1.

Figure 7:
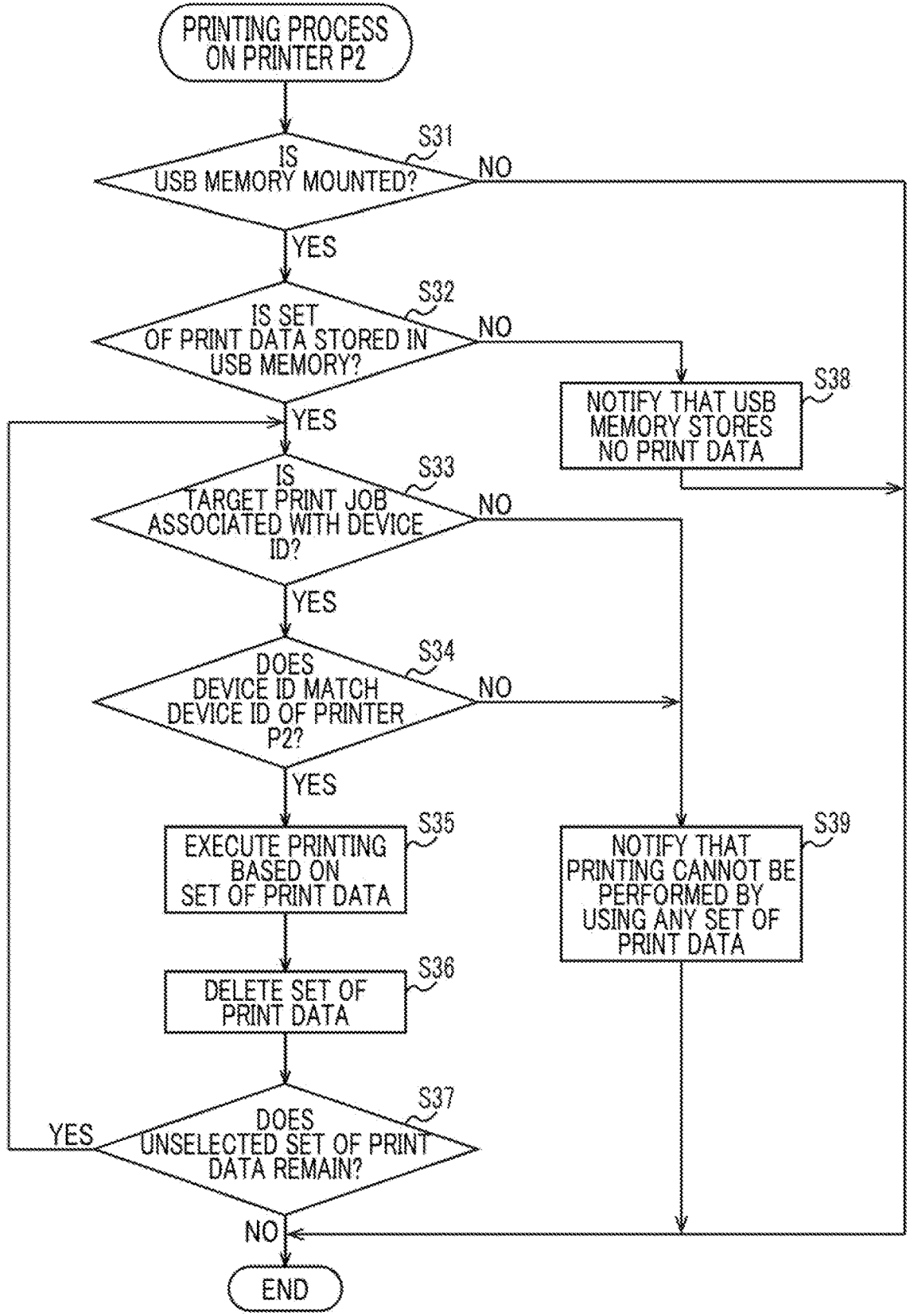
FIG. 7 is a flowchart illustrating a process executed by the image processing device.

Process Performed on the Second Image Processing Device P2 after a Print Job has been Transferred FIG. 7 is a flowchart showing sample steps in a printing process executed by the image processing device 1 serving as the second image processing device P2. Specifically, FIG. 7 shows a printing process performed on the second image processing device P2 after the process shown in FIG. 4 for a print job to be transferred from the first image processing device P1 to the second image processing device P2 has been completed. In other words, FIG. 7 shows steps in a printing process executed on the second image processing device P2 after the user removed the USB memory 31 mounted in the first image processing device P1 and mounted the USB memory 31 into the second USB connector 103 of the second image processing device P2. When starting the process shown in FIG. 7, the second image processing device P2 is registered as the subject of the agreement in the server 8. When the image processing device P2 is registered as the subject of the agreement on the server 8, the image processing device P2, as the subject of the agreement, performs the process shown in FIG. 7.

Printing Process on the Second Image Processing Device P2

In S31 of FIG. 7, the second controller 61 of the second image processing device P2 determines whether the USB memory 31 has been mounted in the second USB connector 103 of the second image processing device P2. When the second controller 61 determines that the USB memory 31 has been mounted in the second USB connector 103 (S31: YES), in S32 the second controller 61 determines whether at least one set of print data is stored in the USB memory 31.

When the second controller 61 determines that at least one set of print data has been stored in the USB memory 31 (S32: YES), in S33 the second controller 61 selects one of the at least one set of print data as a selected set of print data. Hereinafter, a print job included in the selected set of print data is referred to as the target print job. In S33 the second controller 61 determines whether the target print job included in the selected set of print data is associated with any piece of identification information (any device ID) for any image processing device.

When the second controller 61 determines that the target print job is associated with any piece of identification information (any device ID) (S33: YES), the second controller proceeds to S34. In S34 the second controller 61 determines whether the piece of identification information (the device ID) associated with the target print job matches the piece of identification information (the device ID) for the second image processing device P2 stored in the area 622 of the second main memory 62. In other words, subsequently to connection of the external memory to the connector 103 of the second image processing device P2, the second controller 61 determines whether the piece of identification information stored in the USB memory as an example of the external memory matches a piece of identification information for the second image processing device P2. The process of S34 is an example of the process for determining. Note that when a piece of identification information (a device ID) in the selected set of print data stored in the USB memory has been encrypted, the controller 61 first decrypts the piece of identification information (the device ID) before executing the process in S34. That is, in a case that a piece of identification information (any device IDs) in the USB memory has been encrypted, in S34 the second controller 61 determines whether the piece of identification information (the device ID) matches the piece of identification information (the device ID) for the second image processing device P2, subsequently to the second controller decrypting the piece of identification information.

When the second controller 61 determines that the piece of identification information (the device ID), which is associated with the target print job, matches the piece of identification information (the device ID) for the second image processing device P2 (S34: YES), the second controller 61 acquires from the USB memory 31 the selected set of print data having the target print job and the piece of identification (the device ID) matching the piece of identification information (the device ID) for the second image processing device P2, and stores the acquired selected set of print data in the second main memory 62. Next, in S35 the second controller 61 executes printing based on the target print job included in the selected set of print data stored in the second main memory 62. The process of S35 is an example of the process for performing the image process. Since the second image processing device P2 has been registered as the subject of the agreement on the server 8, in S35 the second image processing device P2 as the subject of the agreement executes the printing. That is, when the piece of identification information stored in the USB memory as an example of the external memory has been determined to match the piece of identification information for the second image processing device P2, the second controller 61 executes the image process according to the job information stored in the USB memory as the example of the external memory with the subject of agreement changed to the second image processing device.

After completing the print, in S36 the second controller 61 deletes the selected set of print data including the executed target print job from both the USB memory 31 and the second main memory 62.

In S37 the second controller 61 determines whether any unselected set of print data remains in the USB memory 31. In other words, in S37 the second controller 61 determines whether there is any print job in the USB memory 31 for which the determination of S33 as to whether the print job is associated with any piece of identification information (any device ID) for any image processing device has not been made. When the second controller 61 determines that no unselected set of print data remains (S37: NO), the second controller 61 ends the printing process. However, when the second controller 61 determines in S37 that an unselected set of print data remains (S37: YES), the second controller 61 returns to S33 and repeats the process described above.

Further, when the second controller 61 determines in S31 that USB memory is not mounted in the second USB connector 103 (S31: NO), the second controller 61 ends the printing process.

When the second controller 61 determines in S32 that no set of print data is stored in the USB memory (S32: NO), in S38 the second controller 61 performs a process to notify the user that the USB memory 31 stores no set of print data. Specifically, the second controller 61 controls the second display 64 to display a message indicating that no print data is stored in the USB memory 31, and subsequently ends the printing process.

When the second controller 61 determines in S33 that the target print job is not associated with any piece of identification information (any device ID) for any image processing device (S33: NO), in S39 the second controller 61 performs a process to notify the user that printing cannot be performed by using any set of print data stored in the USB memory 31. Specifically, the second controller 61 controls the second display to display a message indicating that printing cannot be performed by using any set of print data stored in the USB memory 31, and subsequently ends the printing process.

When the second controller 61 determines in S34 that the piece of identification information (the device ID) associated with the target print job does not match the piece of identification information (the device ID) for the second image processing device P2 stored in the second main memory 62 (S34: NO), the second controller 61 proceeds to S39. In S39 the second controller 61 executes the process described above and subsequently ends the printing process.

Effects of the First Embodiment

According to the method of executing image processes on the image processing system 100, the second image processing device P2 executes the printing process after determining that the piece of identification information (the device ID) stored in the USB memory mounted on the second image processing device P2 matches the piece of identification information (the device ID) stored on the second image processing device P2.

In this way, a print job that was not executed on the first image processing device P1 but was stored in the main memory of the first image processing device P1 can only be executed on the second image processing device P2 that replaces the first image processing device P1. In other words, an image processing device other than the replacement device cannot execute a printing process based on this job. Hence, this method can reduce the risk of job being leaked to third parties while replacing the device. Accordingly, with the method of the first embodiment for executing image processes, jobs received by the original image processing device prior to replacement can be executed on the new image processing device replacing the original device while maintaining security.

SECOND EMBODIMENT

In some cases, a user may use a plurality of image processing devices 1 under the agreement. The second embodiment describes a case in which a user using a plurality of image processing devices 1 under an agreement replaces a plurality of the image processing devices 1 at the same time.

As in the first embodiment, the first image processing device P1 denotes an old device, i.e., an image processing device 1 currently used by the user, and the second image processing device P2 denotes a new device, i.e., an image processing device 1 intended as a replacement for the first image processing device P1. In addition, a third image processing device P3 (printer P3) will denote another old image processing device 1 currently used by the user, and a fourth image processing device P4 (printer P4) will denote another new image processing device 1 intended as a replacement for the third image processing device P3. The third image processing device P3 is an example of the third image processing device and the fourth image processing device P4 is an example of the fourth image processing device. Processes performed by the third and fourth image processing devices P3 and P4 are respectively the same as those performed by the first and second image processing devices P1 and P2 in the first embodiment. Further, processes performed for the third and fourth image processing devices P3 and P4 are respectively the same as the processes performed for the first and second image processing devices P1 and P2 in the first embodiment. In the following description, an ordinal numeral "third" may be added components in the third image processing device P3. For example, the controller 61, the main memory 62, the communication interface 63, and the display 64 in the third image processing device P2 may be described as the third controller 61, the third main memory 62, the third communication interface 63, and the third display 64. The third image processing device P3 includes the third controller 61, the third main memory 62, the third communication interface 63, and the third display 64. The area 622 of the third main memory 62 stores a piece of identification information (device ID) for the third image processing device P3. The area 622 of the third main memory 62 stores a piece of identification information (device ID) for the third image processing device P3. Further, an ordinal numeral "fourth" may be added components in the fourth image processing device P4. For example, the controller 61, the main memory 62, the communication interface 63, and the display 64 in the fourth image processing device P4 may be described as the fourth controller 61, the fourth main memory 62, the fourth communication interface 63, and the fourth display 64. The fourth image processing device P4 includes the fourth controller 61, the fourth main memory 62, the fourth communication interface 63, and the fourth display 64. The area 622 of the fourth main memory 62 stores a piece of identification information (device ID) for the fourth image processing device P4. The area 622 of the fourth main memory 62 stores a piece of identification information (device ID) for the fourth image processing device P4. The third image processing device P3 is currently registered on the server 8 as a subject of the agreement and the fourth image processing device P3 is a replacement device to replace the third image processing device P4. That is, the subject of the agreement is changed from the third image processing device P3 to the fourth image processing device P4.

When the service provider ships the second and fourth image processing devices P2 and P4 to the user at the same time, the same identification number may be stored in the respective areas 622 of the second and fourth main memories 62 of the second and fourth image processing devices P2 and P4. That is, the piece of identification information for the second image processing device P2 is identical with the piece of identification information for the fourth image processing device P4. In other words, the identification number may be a group ID representing a group of image processing devices. The group ID is a piece of identification information for both the second and fourth image processing devices P2 and P4 in this example. The group ID may be a piece of identification information for identifying the combination of the second and fourth image processing devices P2 and P4, or the group ID may be a character string which is a combination of the piece of identification information for the second image processing device P2 and the piece of identification information for the fourth image processing device P4.

In S121 of FIG. 4 according to the second embodiment, the server 8 may transmit a group ID common to the second and fourth image processing devices P2 and P4 to the first image processing device P1. The group ID identifies a group the second and fourth image processing devices P2 and P4 belong. The first controller 61 of the first image processing device P1 acquires this group ID from the server 8 and stores the group ID in the main memory 62. The process to acquire the group ID common to the second and fourth image processing devices P2 and P4 is an example of the process for acquiring the piece of identification information.

In S114 of FIG. 4, the first controller 61 of the first image processing device P1 associates a print job received from the user terminal 9 with the group ID stored in the first main memory 62 and stores this associated data in the USB memory 31 that is mounted in the USB connector 103 of the first image processing device P1.

Alternatively, in S121 of FIG. 4 the server 8 may transmit a piece of identification information (a device ID) for the second image processing device P2 and a piece of identification information (a device ID) for the fourth image processing device P4 to the first image processing device P1. The first controller 61 of the first image processing device P1 acquires the individual pieces of identification information (the individual device IDs) for the second and fourth image processing devices P2 and P4 from the server 8 and stores these individual pieces of identification information (these device IDs) in the first main memory 62. The process to acquire the pieces of identification information (the device IDs) for the second and fourth image processing devices P2 and P4 is an example of the process for acquiring the piece of identification information.

When the first controller 61 of the first image processing device P1 acquires the pieces of identification information (the device IDs) for the second and fourth image processing devices P2 and P4, the first controller 61 may control the first display 64 to display a notification prompting the user to select an image processing device for executing print jobs stored in the USB memory 31. In other words, subsequently to both the first controller 61 acquiring the piece of identification information for the second image processing device P2 and the first controller 61 acquiring the piece of identification information for the fourth image processing device P4, the first controller 61 may control a display 64 of the first image processing device P1 to display a notification prompting a user to select one of the second image processing device P2 and the fourth image processing device P4 to execute the image process according to the job information. This allows the user to select what printer (image processing device) will be used to execute print jobs. In this case, the notification may prompt the user to select an image processing device for executing all the print jobs to be stored in the USB memory, so as to allow the user to select a printer to be used to execute all these print jobs. Alternatively, each time the first controller 61 receives a print job, the first controller 61 may control the first display 63 to display a notification to prompt the user to select an image processing device for executing the received print job to be stored in the USB memory 31, so as to allow the user to select a printer to be used to execute that print job. In this case, when a plurality of print jobs is stored in the USB memory 31, a printer to execute one print job stored in the USB memory 31 may be different from a printer to execute another print job stored in the USB memory 31.

In S114 of FIG. 4, the first controller 61 of the first image processing device P1 may associate a print job received from the user terminal 9 with the piece of identification information (the device ID) for the image processing device selected by the user and store this associated data in the USB memory 31 that is mounted in the first USB connector 103 of the first image processing device P1. In this case, when the user selects an image processing device (a printer) to be used to execute all these print jobs, the first controller 61 of the first image processing device P1 may store all the print jobs in the USB memory 31 so that all the print jobs are associated with a piece of identification information (a device ID) for the selected image processing device. Alternatively, when the user selects an image processing device (a printer) for executing each print job, the first controller 61 may store each print job in the USB memory 31 so that the print job is associated with a piece of identification information (a device ID) for the selected image processing device. In other words, subsequently to both the first controller 61 acquiring the piece of identification information for the second image processing device P2 and the first controller 61 acquiring the piece of identification information for the fourth image processing device P4, the first controller 61 selects one of the second image processing device P2 and the fourth image processing device P4 whichever is capable of executing the image process according to the job information. In this case, an image processing device (a printer) associated with one print job may be different from an image processing device (a printer) associated with another print job. Accordingly, only the image processing device selected by the user can execute the print job.

When the first controller 61 of the first image processing device P1 acquires a piece of identification information (a device ID) for the second image processing device P2 and a piece of identification information (a device ID) for the fourth image processing device P4, the first controller 61 may select an image processing device capable of executing the operations in the image process for all the print jobs to be stored in the USB memory 31. Next, the first controller 61 stores, associated with the print jobs, the piece of identification information (the device ID) for the selected image processing device in the USB memory 31 (the external memory). Alternatively, the first controller 61 may select an image processing device capable of executing the operations in the image process for each print job, and stores, associated with that print job, the piece of identification information (the device ID) for the selected image processing device in the USB memory 31 (the external memory). In this case, a selected image processing device for one print job may be different from that for another print job. These methods reduce the possibility of a job received by the first image processing device P1 being unsuccessfully executed on an incompatible image processing device.

The image processing device P3 may performs the same process, which is performed by the image processing device P3, in the process shown in FIG. 4 described in the second embodiment.

Variations of the Embodiments

First Variation

The drum cartridge 20 may possess the developing roller 41 in addition to the photosensitive drum 21, the cartridge case, the drum memory 22, and the charger. In this case, the photosensitive drum 21, the drum memory 22, the charger, and the developing roller 41 are provided in the cartridge case. Additionally, the toner cartridge 4 possesses the cartridge case and the toner memory 42 but not the developing roller 41. The cartridge case of the toner cartridge 4 accommodates toner. The outer circumferential surface of the developing roller 41 contacts the outer circumferential surface of the photosensitive drum 21 inside the drum cartridge 20.

Second Variation

The toner cartridge 4 may be configured of two cartridges (not shown). In this case, the first of the two cartridges constituting the toner cartridge 4 possesses the developing roller 41, while the second cartridge possesses the cartridge case and the toner memory 42. The cartridge case of the toner cartridge 4 accommodates toner.

Third Variation

The image processing device 1 (P1, P2, P3, or P4) may be provided with one or more unified cartridges (not shown) in place of the drum cartridges 20 and the toner cartridges 4. Each unified cartridge possesses the photosensitive drum 21, a cartridge case, a memory, the charger, and the developing roller 41. The outer circumferential surface of the developing roller 41 contacts the outer circumferential surface of the photosensitive drum 21 inside this unified cartridge. The cartridge case of this unified cartridge accommodates toner.

Fourth Variation

Each of the drum cartridges 20 and toner cartridges 4 of the image processing device 1 (P1, P2, P3, or P4) may be capable of being mounted in and removed from the main casing 10 independently.

Fifth Variation

The image processing device 1 (P1, P2, P3, P4) may also be a multifunction peripheral (MFP) provided with other functions such as a scan or facsimile function. When the MFP has a print function, copy function, scan function, facsimile function, and the like, the jobs related to image processes include print jobs, scan jobs related to the scan function, and fax jobs related to the facsimile function. That is, the print jobs are to execute printing, scan jobs are to execute the scanning, and fax jobs to execute the facsimile transmission or facsimile reception. Thus, an image processing device 1 configured as an MFP may still execute the same various processes described in the first embodiment. The image processing device 1 of this variation obtains the same effects as the image processing device 1 in the first embodiment described above.

Sixth Variation

The print medium used in the image processing device 1 (P1, P2, P3, P4) is not limited to paper but may be tape, for example. When the print medium is tape, a tape cassette for supplying tape is mounted in the image processing device 1, and the image processing device 1 prints on tape conveyed from the tape cassette. In this case, the image processing device 1 may be a laser printer or an inkjet printer.

Seventh Variation

The image processing device 1 (P1, P2, P3, P4) may be an inkjet printer. When the image processing device 1 is an inkjet printer, ink cartridges are mounted in the cartridge retaining members 13 of the image processing device 1 instead of the drum cartridges 20 and toner cartridges 4 described in the embodiments. There is no particular restriction on the number of ink cartridges mounted in the image processing device 1. For example, a total of four ink cartridges corresponding to the four colors cyan, magenta, yellow, and black may be mounted in the image processing device 1, or a single cartridge for the single color black may be mounted in the image processing device 1.

Each ink cartridge has a built-in ink memory. The ink memory stores an ink ID, ink type information, and a residual ink quantity, for example. Here, the residual ink quantity is not essential information. The ink ID is information similar to the toner ID. The ink type information is information similar to the toner type information.

Steps performed in the various processes described in the embodiments are similar when the image processing device 1 is an inkjet printer. Specifically, when the image processing device 1 is an inkjet printer, the terms "toner cartridge 4," "toner memory 42," "toner ID," and "toner type information" in the description of the embodiments may be replaced with the terms "ink cartridge," "ink memory," "ink ID," and "ink type information." Thus, the same effects described for the image processing device 1 in the embodiments are obtained when the image processing device 1 is an inkjet printer.

Eighth Variation

The image processing system may include a plurality of servers 8. In this case, the plurality of servers 8 cooperates to perform the process shown in FIG. 4.

Ninth Variation

The subject of the agreement may be changed from the first image processing device P1 to the second image processing device P2 subsequently to the first controller 61 receiving a function deactivation instruction in S111 (or S11) and prior to the second controller executing the image process in S33.

Example Implemented by Software

Functions of the image processing device 1 (P1, P2, P3, P4) are implemented by programs that cause the controller 61 of the image processing device 1, as a computer, execute various functions.

In this case, the image processing device 1 (P1, P2, P3, P4) includes at least one controlling device such as a processor and at least one storage such as a memory as hardware to execute the programs described above. The functions in the embodiments are implemented by executing the programs using the controlling device and the storage.

The programs may be stored in non-transitory computer-readable one or more storage media. The image processing device 1 may include the storage media or may not include the storage media. When the image processing device 1 does not include the storage media, the programs may be supplied to the image processing device via wired or wireless arbitrary transmission media.

All or a part of functions of the controller 61 may be implemented by a logical circuit. For example, the present disclosure includes in scope a case that the controller 61 includes an integrated circuit in which a logical circuit functioning as control blocks is formed.

The second image processing device P2 may have a function to perform the process to deactivate the print function of the second image processing device P2 as shown in FIG. 5 when receiving a function deactivation instruction. The second image processing device P2 may also have a function to perform the printing process as shown in FIG. 6. The first image processing device P1 may have the function to perform the process shown in FIG. 7. Each of the image processing device P1 and the image processing device P2 may perform the processes shown in FIGS. 6 and 7 in parallel or alternately.

Additional Remark

While the invention has been described in conjunction with various example structures outlined above and illustrated in the figures, various alternatives, modifications, variations, improvements, and/or substantial equivalents, whether known or that may be presently unforeseen, may become apparent to those having at least ordinary skill in the art. Accordingly, the example embodiments of the disclosure, as set forth above, are intended to be illustrative of the invention, and not limiting the invention. Various changes may be made without departing from the spirit and scope of the disclosure. Therefore, the disclosure is intended to embrace all known or later developed alternatives, modifications, variations, improvements, and/or substantial equivalents.

What is claimed is:

1. A processing method for transferring a job to execute an image process by changing a subject of an agreement from a first image processing device to a second image processing device, the first image processing device including: a first memory; a first connector to which an external memory is connectable; a first controller; and a first communication interface, the second image processing device including: a second connector to which the external memory is connectable; and a second controller, the processing method comprising:

the first controller acquiring a piece of identification information for the second image processing device from an external device via the first communication interface;

the first controller storing, in the external memory connected to the first connector, the acquired piece of identification information and job information which is stored in the first memory, the job information specifying a job to perform an image process;

subsequently to connection of the external memory to the second connector, the second controller determining whether the piece of identification information stored in the external memory matches a piece of identification information for the second image processing device; and when the piece of identification information stored in the external memory has been determined to match the piece of identification information for the second image processing device, the second controller executing the image process according to the job information stored in the external memory with the subject of agreement changed to the second image processing device;

the method further comprising:

prior to the first controller acquiring the piece of identification information for the second image processing device, the first controller receiving a function deactivation instruction to deactivate a prescribed function of the first image processing device.

2. The processing method according to claim 1, wherein in the first controller storing, the piece of identification information is encrypted when being stored, the processing method further comprising:

the second controller decrypting the encrypted piece of identification information stored in the external memory, wherein the second controller determining is performed subsequently to the second controller decrypting.

3. The processing method according to claim 1, further comprising:

changing another subject of the agreement from a third image processing device to a fourth image processing device: the changing another subject comprising:

the first controller acquiring a piece of identification information for the fourth image processing device from the external device via the first communication interface; and the first controller storing the acquired piece of identification information for the fourth image processing device in the external memory connected to the first connector, wherein the third image processing device is different from the first image processing device, and the fourth image processing device is different from the second image processing device.

4. The processing method according to claim 3, wherein the piece of identification information for the second image processing device is identical to the piece of identification information for the fourth image processing device.

5. The processing method according to claim 1, further comprising:
changing another subject of the agreement from a third image processing device to a fourth image processing device: the changing another subject comprising:
the first controller acquiring a piece of identification information for the fourth image processing device from the external device via the first communication interface; and
subsequently to both the first controller acquiring the piece of identification information for the second image processing device and the first controller acquiring the piece of identification information for the fourth image processing device, the first controller controlling a display of the first image processing device to display a notification prompting a user to select one of the second image processing device and the fourth image processing device to execute the image process according to the job information,
wherein the third image processing device is different from the first image processing device, and the fourth image processing device is different from the second image processing device.

6. The processing method according to claim 5, further comprising:
subsequently to both the first controller acquiring the piece of identification information for the second image processing device and the first controller acquiring the piece of identification information for the fourth image processing device, the first controller selecting one of the second image processing device and the fourth image processing device whichever is capable of executing the image process according to the job information; and
the first controller storing the piece of identification information for the fourth image processing device in the external memory in a case that the first controller has selected the fourth image processing device,
wherein the first controller storing the piece of identification information for the second image processing device is performed in a case that the first controller has selected the second image processing device.

7. The processing method according to claim 1, wherein the subject of the agreement is changed from the first image processing device to the second image processing device subsequently to the first controller receiving the function deactivation instruction and prior to the second controller executing the image process.

8. The processing method according to claim 1, further comprising:
in a case that the first controller has received the job information subsequently to the first controller acquiring the piece of identification information for the second image processing device, the first controller controlling a display of the first image processing device to display a notification prompting a user to connect the external memory to the first connector.

9. A processing method for transferring a job to execute an image process by changing a subject of an agreement from a first image processing device to a second image processing device, the first image processing device including: a first memory; a first connector to which an external memory is connectable; a first controller; and a first communication interface, the second image processing device including: a second connector to which the external memory is connectable; and a second controller, the processing method comprising:
the first controller acquiring a piece of identification information for the second image processing device from an external device via the first communication interface;
the first controller storing, in the external memory connected to the first connector, the acquired piece of identification information and job information which is stored in the first memory, the job information specifying a job to perform an image process;
subsequently to the first controller storing the acquired piece of identification information for the second image processing device and the job information in the external memory, the first controller controlling a display of the first image processing device to display a notification prompting a user to connect the external memory to the second connector;
subsequently to connection of the external memory to the second connector, the second controller determining whether the piece of identification information stored in the external memory matches a piece of identification information for the second image processing device; and
when the piece of identification information stored in the external memory has been determined to match the piece of identification information for the second image processing device, the second controller executing the image process according to the job information stored in the external memory with the subject of agreement changed to the second image processing device.

10. A processing method for transferring a job to execute an image process by changing a subject of an agreement from a first image processing device to a second image processing device, the first image processing device including: a first memory; a first connector to which an external memory is connectable; a first controller; and a first communication interface, the second image processing device including: a second connector to which the external memory is connectable; and a second controller, the processing method comprising:
the first controller acquiring a piece of identification information for the second image processing device from an external device via the first communication interface;
the first controller storing, in the external memory connected to the first connector, the acquired piece of identification information and job information which is stored in the first memory, the job information specifying a job to perform an image process;
subsequently to connection of the external memory to the second connector, the second controller determining whether the piece of identification information stored in the external memory matches a piece of identification information for the second image processing device; and
when the piece of identification information stored in the external memory has been determined to match the piece of identification information for the second image processing device, the second controller executing the image process according to the job information stored in the external memory with the subject of agreement changed to the second image processing device;
the method further comprising:
subsequently to the first controller storing, in the external memory, the acquired piece of identification information for the second image processing device and the job information, the first controller sending, to the external device, a first notification;

the second controller receiving from the external device a second notification via a second communication interface of the second image processing device, the second notification being sent to the second image processing device from the external device subsequently to reception of the first notification by the external device; and subsequently to the second controller receiving, via the second communication interface, the second notification from the external device, the second controller controlling a display of the second image processing device to display a third notification prompting a user to connect the external memory to the second connector.

11. An image processing device comprising:
a connector to which an external memory is connectable;
a communication interface; and
a controller configured to perform:
  acquiring a function deactivating instruction, the function deactivating instruction being to instruct to deactivate a prescribed function of the image processing device;
  subsequently to the acquiring the function deactivating instruction, acquiring a piece of identification information for another image processing device from an external device via the communication interface;
  subsequently to the acquiring the function deactivating instruction, receiving a job to execute an image process; and
  subsequently to receiving the job, storing the piece of identification information and job information in the external memory connected to the connector, the job information specifying the job.

12. The image processing device according to claim 11, the controller is further configured to perform, subsequently to storing the piece of identification information for the another image processing device and the job information in the external memory, controlling a display to display a notification prompting a user to connect the external memory to another connector of the another image processing device.

13. An image processing device comprising:
a memory;
a connector to which an external memory is connectable;
a communication interface;
a display; and
a controller configured to perform:
  subsequently to reception of a first notification by an external device, receiving from the external device a second notification via the communication interface, the first notification being sent to the external device in response to storing, in the external memory connected to another connector of another image processing device, a piece of identification information for the image processing device and the job information;
  controlling the display to display a notification;
  when the external memory, which stores both the job information and the piece of identification information, has been connected to the connector, determining whether the piece of identification information stored in the external memory matches a piece of identification information stored in the memory, the job information specifying a job to execute an image process; and
  when the piece of identification information stored in the external memory has been determined to match the piece of identification information stored in the memory, executing the image process according to the job information stored in the external memory.

* * * * *